United States Patent [19]

Klein

[11] Patent Number: 4,819,179

[45] Date of Patent: Apr. 4, 1989

[54] DIGITAL SLIP FREQUENCY GENERATOR AND METHOD FOR DETERMINING THE DESIRED SLIP FREQUENCY

[75] Inventor: Frederick F. Klein, Monroeville, Pa.

[73] Assignee: The United States of America as represented by the United States Department of Energy, Washington, D.C.

[21] Appl. No.: 116,292

[22] Filed: Nov. 3, 1987

[51] Int. Cl.$^4$ .............................................. H02P 9/42
[52] U.S. Cl. ...................................... 364/484; 322/28; 322/29
[58] Field of Search ..................... 364/484; 322/28, 29, 322/32

[56] References Cited

U.S. PATENT DOCUMENTS

| 3,731,169 | 5/1973 | Burgholte | 318/227 |
| 3,832,609 | 8/1974 | Barrett et al. | 318/52 |
| 4,246,531 | 1/1981 | Jordan | 322/28 |
| 4,327,420 | 4/1982 | Gdula et al. | 364/721 |
| 4,463,306 | 7/1984 | de Mello et al. | 322/25 |

Primary Examiner—Emanuel S. Kemeny
Attorney, Agent, or Firm—James W. Weinberger; Thomas G. Anderson; Judson R. Hightower

[57] ABSTRACT

The output frequency of an electric power generator is kept constant with variable rotor speed by automatic adjustment of the excitation slip frequency. The invention features a digital slip frequency generator which provides sine and cosine waveforms from a look-up table, which are combined with real and reactive power output of the power generator.

11 Claims, 2 Drawing Sheets

DIGITAL SLIP FREQUENCY GENERATOR AND METHOD FOR DETERMINING THE DESIRED SLIP FREQUENCY

FIELD OF THE INVENTION

The present invention relates to a device and a method used in connection with a variable speed generator for generating an output at a constant frequency. More specifically, the present invention relates to a slip frequency generator implemented using digital circuitry and to a method for generating the desired slip frequency waveform.

BACKGROUND OF THE INVENTION

Sometimes it is desirable to operate a generator at variable speeds rather than at a constant speed. Some applications where this is desirable is in generating electricity from wind power or hydropower. In these applications, the energy source is not constant. Therefore, it is desirable for generators used in such applications to operate at a speed and frequency which varies as the input energy source varies. However, the frequency of the output of the generator must be constant.

The equation which relates the various frequencies in a variable speed generator is:

$$f_{slip} = f_r - f_s \qquad (1)$$

where $f_s$ is the synchronous or line frequency (typically 60 hertz); $f_r$ is the equivalent electrical rotor frequency and $f_{slip}$ is the slip frequency. The line frequency $f_s$ is the desired frequency or output frequency at which the generator must produce power. The equivalent electrical rotor frequency $f_r$ is related to the rotor speed. In a typical situation, $f_s$ is known and is the line frequency, and $f_r$, although it varies with the rotor speed, can be determined from the rotor speed and the electrical configuration of the generator. Therefore, by varying the slip frequency $f_{slip}$ as the rotor speed varies, equation (1) can be satisfied enabling the variable speed generator to produce a constant frequency output at the line frequency $f_s$.

Generally, the slip frequency in a variable speed generator is determined by a device known as a slip frequency generator. The slip frequency generator is part of the overall control system for the variable speed generator. Some examples of control systems which calculate or monitor the slip frequency are described in U.S. Pat. Nos. 3,371,306; 3,832,609; 4,327,420; and 4,463,306.

In previous control systems for variable speed generators, a closed loop analog or digital feedback system has been used to generate the slip frequency which should be applied to the variable speed generator to satisfy equation (1). In such systems, the output power of the motor was measured, calculations were performed by the circuitry and a new slip frequency was determined by the slip frequency generator which was then applied to the generator. The output power was again measured and further modifications and calculations were done. The problem with this type of control system was that the machine output was never exactly as desired. The control system was always chasing the desired behavior of the variable speed generator, especially if the input changed.

Another system for controlling a variable speed generator was an open loop system using a combination of analog and discrete digital circuitry to generate the appropriate slip frequency. This type of system required as its inputs, all three phases of the line voltage and the rotor speed. The inputs were processed by analog circuitry which included filtering, phase shifting, summation and multiplication. Digital logic was then used to select the appropriate slip frequency signal from the analog output. The disadvantage with this type of system was that the large number of analog and discrete digital circuit elements was subject to errors due to component drift over time and due to changes in temperature. The result was that the output of the control system could be significantly distorted. This resulted in an equivalent distortion in the generator output at the slip frequency and its harmonics.

SUMMARY OF THE INVENTION

The present invention therefore to provide a digital slip frequency generator and a method for determining the appropriate slip frequency and slip frequency waveform which overcomes the problems of the previous control systems without requiring the use of precision or adjustable components or complicated circuitry.

The present invention provides a slip frequency generator which produces a sequence of slip frequency voltages that represent a constant amplitude sine and cosine wave having a frequency that is exactly the difference between the synchronous frequency and the equivalent electrical frequency of the rotor. The slip frequency generator produces the appropriate sine and cosine values digitally using predetermined reference values, preferably stored in memory. The sine and cosine values are converted to slip frequency waveforms which are used by the control system to operate the variable speed generator. Preferably they are combined with the desired power and reactive power output to obtain the current which should be applied to the rotor of the generator.

The digital slip frequency generator of the present invention is comprised of a calculating means and a plurality of predetermined reference values representing a desired waveform. Preferably these reference values represent one cycle of a sine wave but they could also represent one cycle of a cosine wave or any other appropriate waveform which could be used to represent the desired slip frequency waveform. The calculating means preferably utilizes three inputs, namely, the zero crossing of one phase of the line voltage, a rotor speed signal, preferably developed from a pulse generator, and a rotor position signal, also preferably developed from a pulse generator. The calculating means uses the zero crossing of the line voltage, the rotor speed signal and the rotor position signal to determine the sequence of voltages which approximates the desired output. The calculating means selects the appropriate values from the predetermined reference values which represent the desired slip frequency waveform. The calculating means also determines any other associated values, such as the corresponding cosine value, if for example, a sine value is selected, and sends them to the output means which uses the selected reference values to generate the appropriate analog slip frequency waveform.

The present invention also provides a method for determining the desired slip frequency for use in a generator control system comprising the steps of: determining the frequency of one phase of the line voltage; determining the equivalent electrical rotor frequency from the rotor speed; determining the rotor position; calculating from the line frequency, the equivalent electrical rotor frequency, and the rotor position, the number of steps to move through a series of predetermined reference values representing the desired slip frequency waveform; selecting the appropriate slip frequency value from the reference values; and outputting the appropriate slip frequency waveform to the rest of the control system.

Other details, objects and advantages of the present invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which.

DETAILED DESCRIPTION OF THE INVENTION

The slip frequency generator of the present invention is used to determine the proper slip frequency which can be applied by a control system to the rotor of a variable speed generator to allow the generator to rotate at various speeds yet produce electricity at the externally imposed line frequency. To accomplish this, the sum of the equivalent electrical rotor frequency (i.e., the rotor speed multiplied by half the ratio of the number of electrical phases to the number of electrical poles) and the slip frequency must equal the line frequency as stated in equation 1. Variation from line frequency will adversely affect the generator's output power.

Figure 1:
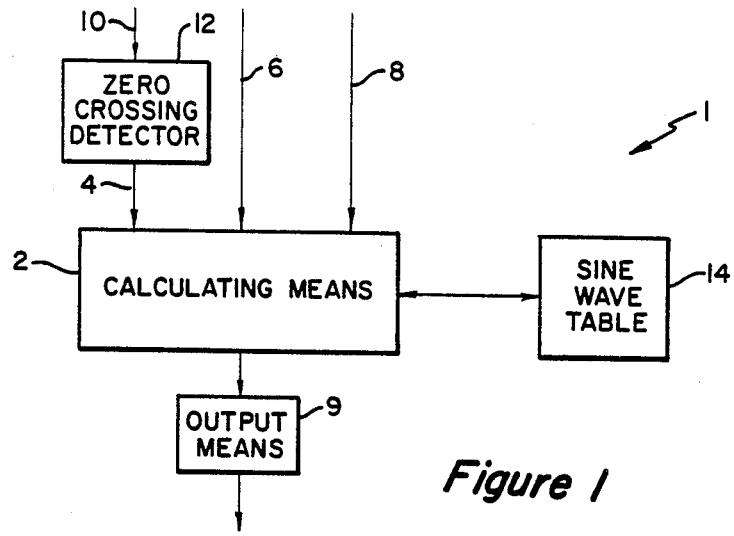
FIG. 1 is a block diagram of a digital slip frequency generator.

The present invention provides a digital slip frequency generator which preferably outputs a sine wave and a cosine wave at the appropriate slip frequency. By using the digitally based system of the present invention, maintenance is reduced and control flexibility is increased. As shown in FIG. 1, digital slip frequency generator 1 utilizes a calculating means 2 which receives three input signals, namely: a line frequency signal 4; a rotor speed signal 6; and a position signal 8; calculating means 2 uses these input signals to select the sine and cosine values corresponding to the desired slip frequency. An output means 9 converts the sine and cosine values into analog signals which can be applied to the rotor of a generator through other control equipment.

Preferably rotor speed signal 6 is generated by a tachometer which is preferably a toothed gear placed on the rotor shaft of the generator. Pulses (called tachometer pulses) are generated by each tooth and are fed to calculating means 2 as a rotor speed signal 6. By measuring the time interval between tachometer pulses the rotor speed can be determined. Knowing the number of teeth on the tachometer gear on the rotor shaft and the number of poles on the generator, calculating means 2 can determine the equivalent electrical rotor frequency $f_r$ using the following equations: (a) $f_r = r_s(N_p/2)$ where $r_s$ is the rotor speed in rotations per second and $N_p$ is the number of electrical poles on the generator; and (b) $r_s = P_t/N_t$ where Pt is the number of tachometer pulses per second and $N_t$ is the number of teeth on the tachometer gear on the rotor shaft.

Line frequency signal 4 is a series of pulses, each one generated by measuring the positive zero voltage crossing of one phase of line voltage 10 on a stator. By measuring the time between the pulses, (i.e., the zero crossings) calculating means 2 can determine the line frequency $f_s$ using the equation $f_s = 1/P_s$ where $P_s$ is the time between consecutive zero crossing pulses. In a preferred embodiment, zero crossing detector 12 detects the positive zero voltage crossings of line voltage 10 and generates the zero crossing pulses which constitute line frequency signal 4. Preferably line voltage 10 is transformed down and filtered before being fed to zero crossing detector 12 which is preferably a comparator.

The third input, rotor position signal 8, preferably is a pulse generated from a one toothed gear on the rotor shaft. It is used by calculating means 2 to determine the actual position of the rotor and to verify and correct the current location in the predetermined values.

The digital slip frequency generator of the present invention operates by having calculating means 2 step through a series of predetermined reference values, typically a sine wave table 14, which is stored in memory to select the appropriate slip frequency waveform value. Actually, calculating means 2 has a moveable index which points to locations in reference values 14. The number of steps to be taken in the predetermined reference values to obtain the desired slip frequency waveform value is related to the period of the line voltage and the period of the rotor. For example, if there are $N_s$ steps in reference values 14, then $N_s$ steps must be taken for one cycle of the slip frequency waveform. For a given slip frequency, the time needed for one pass through reference values 14 is (c) $T_p = 1/f_{slip}$ where $T_p$ is the time in seconds for one pass through reference values 14.

In the present invention, a new slip frequency value is selected from reference values 14 for every tachometer pulse received on rotor speed signal 6. When this is done, the number of steps m moved by calculating means 2 through reference values 14 since the last tachometer pulse is calculated using the following equation:

$$m = N_s/(P_t T_p). \tag{2}$$

Equation (2) can be transformed by substitution using equations 1, (a), (b) and (c) as follows:

$$\begin{aligned} m &= N_s f_{slip}/(r_s N_t) \\ m &= N_s N_p (f_r - f_s)/(2 f_r N_t) \\ m &= \frac{N_s N_p}{2 N_t} \left[ 1 - \frac{f_s}{f_r} \right] \end{aligned} \tag{3}$$

By knowing the equivalent electrical rotor frequency $f_r$ and the line frequency $f_s$, one can determine the number of steps m to move in reference values 14 since the last calculation.

Figure 2:
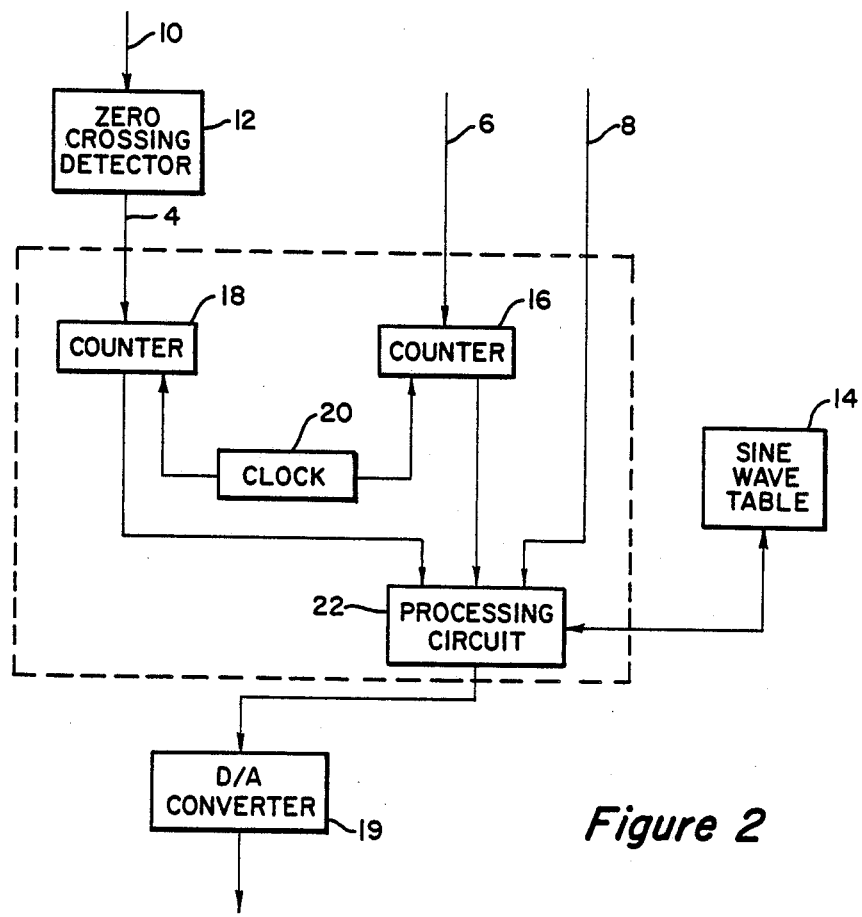
FIG. 2 is a block diagram of a preferred embodiment of a digital slip frequency generator.

FIG. 2 shows a preferred embodiment of digital slip frequency generator 1 showing how calculating means 2 uses equation 3 to determine how many steps to move through reference values 14. A first counter 16 in calculating means 2 counts the time between tachometer pulses on rotor speed signal 6 and a second counter 18 counts the time between zero crossing pulses on line frequency signal 4. Both counter 16 (i.e., the rotor frequency counter) and counter 18 (i.e., the line frequency counter) count the number of clock pulses received from a clock 20 which has a frequency of R counts/sec. If one assumes that there are L counts on line frequency counter 18 representing the number of counts between two line frequency signals, and T counts on rotor frequency counter 16 representing the number of counts between two rotor speed signals, then the line frequency $f_s$ and the equivalent electrical rotor frequency $f_r$ can be expressed by the following equations.

$$f_s = R/L \tag{4}$$

$$f_r = N_p R/(2TN_t) \tag{5}$$

Substituting equations 4 and 5 into equation 3 yields the relationship between the number of steps to be moved in reference values 14 and the number of counts in counters 16 and 18:

$$m = \frac{N_p N_s}{2N_t}\left[1 - \frac{2RTN_t}{RLN_p}\right] \tag{6}$$

$$m = \frac{N_s N_p}{2N_t} - \frac{N_s T}{L}$$

Processing circuit 22 implements equation 6 using the values in counters 16 and 18 to determine the value for m which is then used to select the appropriate value of slip frequency waveform from reference values 14.

In one preferred embodiment, digital slip frequency generator 1 could be implemented using an Intel 86/30 microcomputer board as calculating means 2 although various microprocessors and microcomputers could be used for both calculating means 2 and processing circuit 22. Predetermined reference values 14 in the form of a sine wave table preferably has at least 1200 values or steps in it. These values should have at least 10 bits, although 12 is preferable. The tachometer gear on the rotor shaft could have 72 teeth and the variable speed generator often can have 6 poles. Substituting these values into equation 6 results in the following equation:

$$m = 50 - 1200T/L \tag{7}$$

Equation 7 is the equation which processing circuit 22 implements to determine how many steps to move through reference values 14 since the last calculation to obtain the proper value for the slip frequency. As can be seen from equation 7, the number of steps is related to a constant which depends on the particular generator and tachometer, minus the ratio of the values in counters 16 and 18. Fractional values of m should be accumulated, at least until a position pulse if received when the calculation of m can be verified.

The number of teeth on the tachometer gear is not crucial as long as sufficient tachometer pulses are generated on rotor speed signal 6 to frequently update the slip frequency waveform since the slip frequency waveform is updated every time a tachometer pulse is received by calculating means 2. Preferably, the number of teeth is chosen so that the first term in equation 6 is an integer. Similarly, the exact clock frequency R is not crucial as long as it is high enough to produce good resolution for pulses on rotor speed signal 6. Clock 20 in one preferred embodiment has a rate of 1.23 MHz which will produce about 850 counts per rotor speed signal 6 and 20,500 counts per line frequency signal 4.

Once the desired reference value is selected from reference values 14, processing circuit 22 moves through reference values 14 an equivalent of 90° to obtain the corresponding cosine value. For a series of reference sine values having 1200 steps, this means moving 300 steps to obtain the corresponding cosine value. Processing circuit 22 sends the selected sine and cosine values to output means 9, such as a D/A converter 19, to generate the appropriate slip frequency waveform. Alternatively, the selected values can be utilized as a series of digital numbers by other parts of the generator control system.

Figure 3:
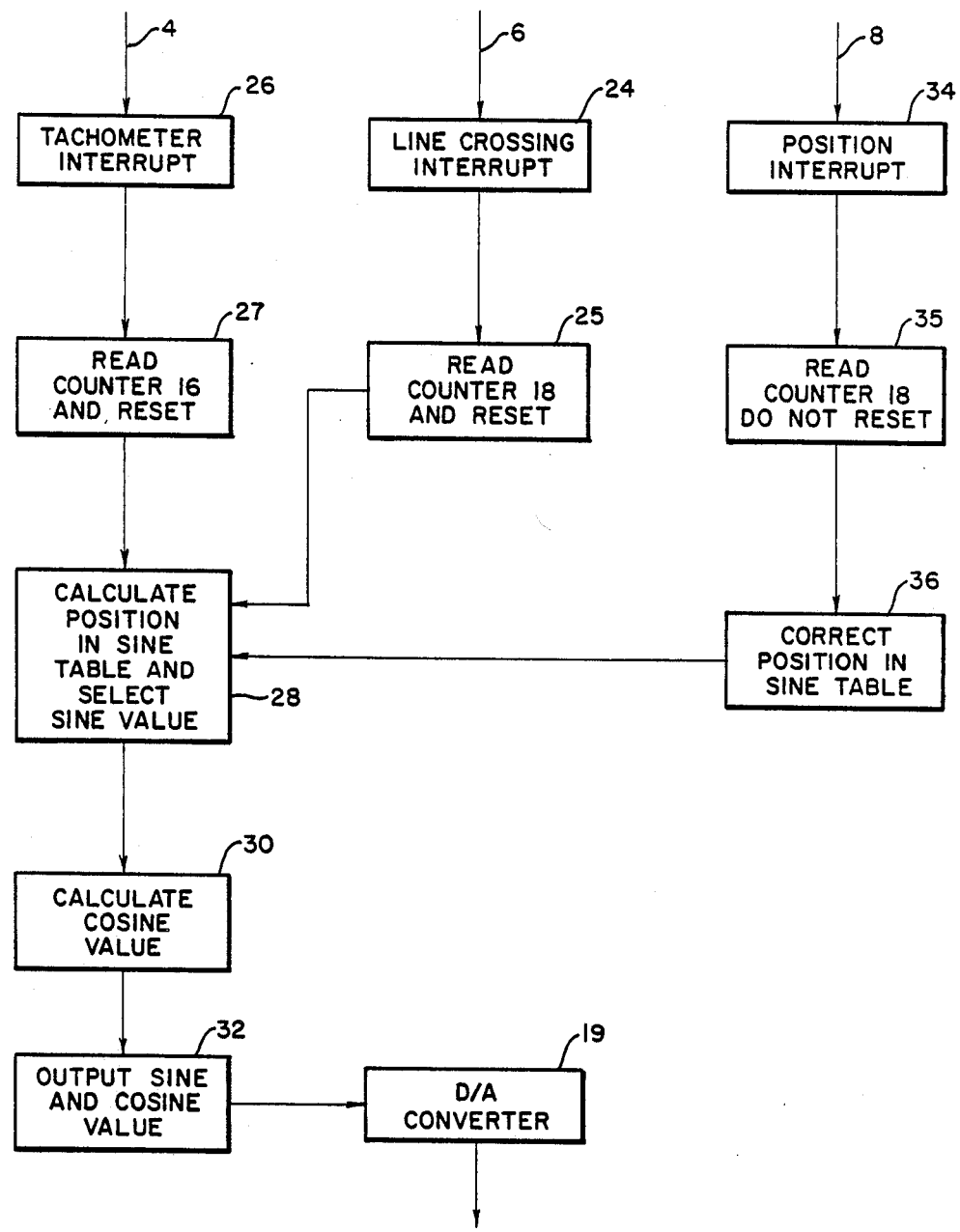
FIG. 3 is a block diagram of a method by which the digital slip frequency generator selects the appropriate sine and cosine values for the desired slip frequency waveform.

FIG. 3 shows a block diagram of the method used by the present invention to determine the appropriate values for the slip frequency waveform. Whenever a pulse is received on line frequency signal 6, a line crossing interrupt 24 stops counter 18 and transfers the contents of counter 18 (L counts) to processing circuit 22 in step 25. Counter 18 is then reset to zero. Whenever a tachometer pulse is received on rotor speed signal 4, a tachometer interrupt 26 stops counter 16 and transfers the contents of counter 16 (T counts) to processing circuit 22 in step 27. Counter 16 is then reset to zero. When the contents of counter 16 are transferred, processing circuit 22 uses equation 6 to calculate the number of steps m to move through reference values 14 from the last position to select the appropriate value for the slip frequency waveform. As shown in step 28, the sine value is selected.

An important feature of the present invention is that it can adjust the phase of the output based upon the phase of the line voltage and the position of the rotor. This is necessary to compensate for any missed tachometer pulses or when noise causes extra tachometer pulses and also to correct for truncation errors and quantization errors in the calculation of m. Calculating means 2 uses rotor position signal 8 to establish an absolute position reference for the rotor, thereby aligning the slip frequency with the rotor position. Rotor position signal 8 causes calculating means 2 to read line crossing counter 18, without resetting it. In one preferred embodiment as shown in FIG. 3, rotor position signal 8 activates position interrupt 34 which causes processing circuit 22 to read counter 18 in step 35.

When rotor position signal 8 is received, the fraction through the predetermined reference values and the fraction through the line frequency cycle should differ by a constant offset value expressed by the following equation:

$$Offset = Sp/N_s - Lpos/L_1 \tag{8}$$

where Sp is the current position in the predetermined reference values, $N_s$ is the total number of steps in the predetermined reference values, Lpos is the number of counts in line crossing counter 18 between the last line frequency pulse and the present position reference pulse, and $L_1$ is the number of counts between the last two line frequency pulses. The value for Offset is determined experimentally for each machine when the present invention is first implemented. Once it is determined, equation 8 can be used to verify that the current value of Sp is correct. If it is not, it can be adjusted to the correct value each time a rotor position signal 8 is received. In this way, the present invention will maintain its accuracy over time.

The slip frequency generator of the present invention has been implemented on an Intel 86/30 computer board. The output of the slip frequency generator was in the form of a series of numbers defining a waveform which were routed to a digital-to-analog converter via the Multibus backplane. The sine and cosine reference values from the slip frequency generator were used instead of similar values previously produced by an analog slip frequency generator. A variable speed generator was operated throughout all of the operations and conditions that had previously been operated with the analog slip frequency generator, but using the digital slip frequency generator of the present invention to provide the desired slip frequency reference values. No decrease in generator performance could be detected by using the digital slip frequency generator.

While a presently preferred embodiment of practicing the invention has been shown and described with particularity in connection with the accompanying drawings, the invention may be otherwise embodied within the scope of the following claims.

What is claimed is:

1. A digital slip frequency generator comprising:
 a plurality of predetermined reference values which define a waveform;
 a calculating means utilizing a line frequency signal, a rotor speed signal and a rotor position signal to select slip frequency waveform values from a plurality of predetermined reference values; and
 an output means for converting the selected predetermined reference values into the appropriate slip frequency waveform.

2. A digital slip frequency generator as described in claim 1 wherein the output means comprises a digital to analog converter.

3. A digital slip frequency generator as described in claim 1 wherein the calculating means comprises;
 a clock for generating clock pulses;
 a first counter for counting the number of clock pulses between line frequency signals and sending the counted value to a processing circuit;
 a second counter for counting the number of clock pulses between rotor speed signals and sending the counted value to the processing circuit;
 a processing circuit for utilizing the counted values from the first and second counters and the rotor position signal to determine which values to select from the plurality of predetermined reference values, selecting the predetermined reference values and sending them to the output means to generate the appropriate slip frequency waveform.

4. A digital slip frequency generator as described in claim 3 wherein the rotor position signal causes the processing circuit to read the value in the first counter and determine if the selection of the predetermined reference values corresponds with the rotor position.

5. A digital slip frequency generator as described in claim 4 wherein the plurality of predetermined reference values comprises sine wave values.

6. A digital slip frequency generator as described in claim 4 wherein the plurality of predetermined reference values comprises cosine wave values.

7. A method for determining a desired slip frequency waveform for use in a control system comprising the steps of:
 determining a line frequency for one phase of a line voltage;
 determining a rotor frequency from a rotor speed signal;
 calculating from the line frequency and the rotor frequency the number of steps to move through a plurality of predetermined reference values representing a desired slip frequency waveform;
 moving through the plurality of predetermined reference values and selecting the appropriate values of the slip frequency waveform; and
 outputting the appropriate slip frequency waveform to the rest of the control system.

8. A method as described in claim 7 further comprising the step of adjusting the number of steps moved through the plurality of predetermined reference values depending upon a rotor position signal.

9. A method as described in claim 8 wherein the step of determining a line frequency for one phase of a line voltage comprises counting the number of clock pulses between line frequency signals.

10. A method as described in claim 9 wherein the step of determining a rotor frequency from a rotor speed signal comprises counting the number of clock pulses between rotor speed signals.

11. A method as described in claim 10 wherein the values selected from the plurality of predetermined reference values are sine and cosine values.

* * * * *